July 25, 1950 H. P. KALMUS ET AL 2,516,392

SIGNAL TRANSLATING APPARATUS

Filed May 1, 1948 2 Sheets-Sheet 1

HENRY P. KALMUS
ROBERT LEE PRICE
*INVENTOR.*

BY Bruce L Burchard

*HIS AGENT*

July 25, 1950 H. P. KALMUS ET AL 2,516,392

SIGNAL TRANSLATING APPARATUS

Filed May 1, 1948 2 Sheets-Sheet 2

HENRY P. KALMUS
ROBERT LEE PRICE
INVENTOR.

BY Bruce L. Birchard

HIS AGENT

Patented July 25, 1950 2,516,392

UNITED STATES PATENT OFFICE 2,516,392

SIGNAL TRANSLATING APPARATUS

Henry P. Kalmus, Washington, D. C., and Robert Lee Price, Chicago, Ill., assignors to Zenith Radio Corporation, a corporation of Illinois Application May 1, 1948, Serial No. 24,506

7 Claims. (Cl. 179—100.41)

Figure 1:
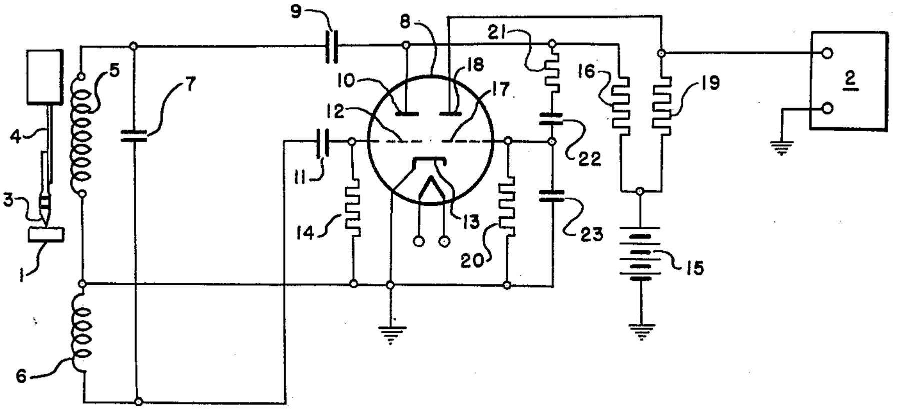

This invention relates to signal translating apparatus of the type in which vibrations of a member at audio frequencies produce corresponding variations in current in an associated electrical circuit. More particularly, the invention pertains to such arrangements as phonograph pick-up devices and associated apparatus in which vibrations of a member produce modulation of a high frequency wave.

In the co-pending application of Henry P. Kalmus, Serial No. 585,826, filed March 31, 1945, for Modulated-Oscillator Type Phonograph Reproduction System, issued November 29, 1949, as Patent No. 2,489,378, and assigned to the same assignee as the present application, there is disclosed as a preferred embodiment a novel type of phonograph transducer, or pick-up, wherein a member is vibrated in accordance with the undulations of a sound track on a movable record medium, thereby to vary the impedance of a winding associated with the member, and to produce corresponding variations in the amplitude of oscillations generated in a tuned circuit including such winding. This system affords a frequency response which is characterized by a rather sharp cut-off at or about 4000 cycles per second. While a pick-up of this type is entirely satisfactory for most applications, and is in fact preferred for many, it is desirable in some applications to provide a phonograph pick-up which obtains high fidelity output, the frequency response characteristic including frequencies up to the neighborhood of 10,000 cycles per second. It is an important object of the present invention, therefore, to provide an improved mechano-electrical transducer, such as a phonograph pick-up, of the type disclosed in the aforementioned copending application, the frequency response characteristic of such improved transducer including frequencies up to the vicinity of 10,000 cycles per second.

In producing phonograph records, it is customary at the present time to employ a constant amplitude cut at low frequencies and a constant velocity cut at higher frequencies, the cross-over point between constant amplitude cut and constant velocity cut being in the neighborhood of 300–500 cycles per second. In making the constant velocity cut, it is customary to decrease the amplitude of the cut 6 decibels per octave.

It is an important object of the present invention, therefore, to provide an improved type phonograph pick-up which provides high fidelity reproduction from such a record.

Still another important object of the present invention is to provide a phonograph pick-up having a high fidelity response characteristic, such pick-up being particularly adapted to rapid and economical construction on a mass production basis.

One of the important considerations which must be taken into account in providing a high fidelity phonograph pick-up is that the frequency response characteristic, for optimum performance, must be free of any abrupt variations. In other words, a smooth frequency response characteristic is desired. It is an important object of the present invention to provide a high fidelity mechano-electrical transducer which is characterized by a frequency response characteristic free from any abrupt variations.

In accordance with the present invention, the vibrating member or vane which produces changes in the impedance of an associated coil, thereby to amplitude modulate a high frequency wave in accordance with the undulations of a record disc, is constructed in such manner that a plurality of coupled effectively discrete mechanical systems is obtained. By making these oscillatory systems different as to mass and compliance, a separate resonant peak is obtained for each, the resonant frequencies of these peaks being dependent upon the masses and compliances of the respective systems. In this manner, it is possible to provide a vane which, when utilized in conjunction with the above mentioned coil, provides a high fidelity frequency response characteristic of any desired shape.

Figure 2:
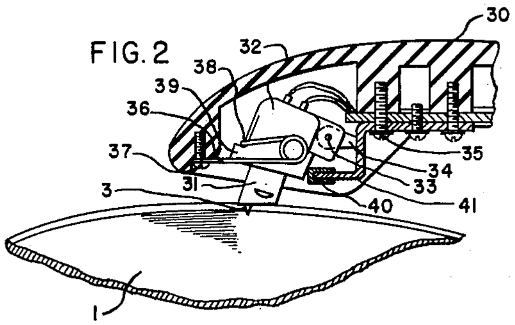
Figure 3:
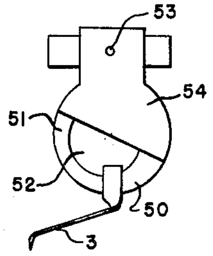
Figure 4:
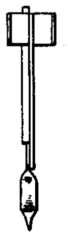
Figure 5:
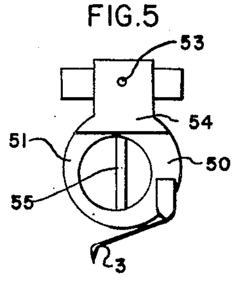
Figure 6:
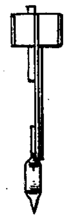
Figure 7:
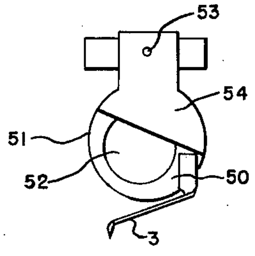
Figure 8:
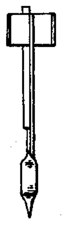
Figure 9:
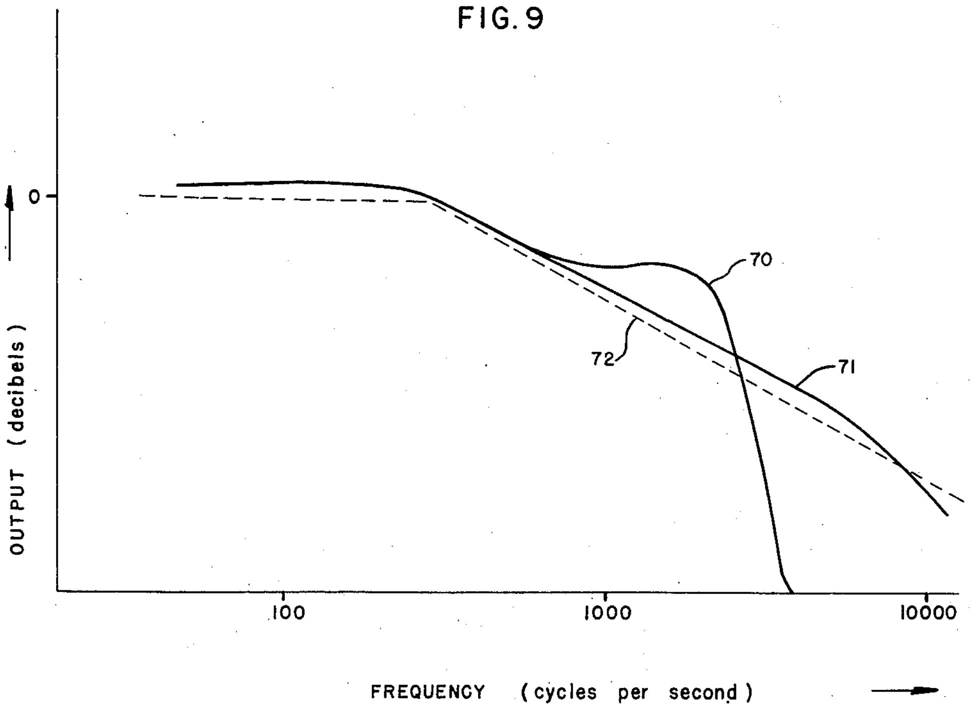

The features of the present invention which are believed to be novel are set forth with particularity in the appended claims. The invention, together with further objects and advantages thereof, may more readily be understood, however, by reference to the following description taken in connection with the accompanying drawings, in which Figure 1 is a schematic representation of an electrical circuit which embodies the present invention; Figure 2 is a fragmentary view, partly in section, of a tone arm cooperating with a record disc; Figure 3 is a front view of a vane for use with the arrangement shown in Figures 1 and 2 and constructed in accordance with the present invention; Figure 4 is a side view of the vane of Figure 3; Figure 5 is a front view of a modification of the vane shown in Figures 3 and 4; Figure 6 is a side view of the vane of Figure 5; Figure 7 is a front view of a preferred modification of the vane shown in Figures 3 and 4; Figure 8 is a side view of the vane of Figure 7; and Figure 9 is a typical frequency response characteristic obtainable by employing the vane shown in Figures 7 and 8. In the figures, like reference numerals indicate like elements.

The apparatus described herein, set forth by way of example of one kind of apparatus which may embody the present invention, is arranged as shown in Figure 1 to transform intelligence recorded on a record disc 1 into suitable current variations of audible frequency in a utilization or amplifying device 2.

The intelligence on record disc 1 is in the form of laterally cut impressions of undulating character in which a suitable stylus 3 travels as the record disc 1 is rotated by conventional means, whereby a vibratory member 4 attached to the stylus is vibrated to produce corresponding changes in the impedance of an inductance element or coil 5. Coil 5 is coupled to the vibratory member 4, whereby cyclical mechanical movement of the stylus 3 produces corresponding changes in the impedance of the inductance element 5.

Coil 5, whose effective resistance or inductance may be cyclically altered by corresponding movement of stylus 3, constitutes one element of a single tuned circuit 5, 6, 7 in an oscillatory circuit including an electron discharge device 8, shown here as a twin triode. The first triode section of device 8, together with its associated circuits, functions not only as an oscillation generator, but also as a demodulator or detector, in a manner hereinafter to be described.

The circuit formed by the serially connected inductances 5 and 6 is connected in parallel with a capacitance 7 to form a parallel tuned circuit 5, 6, 7. One terminal of the tuned circuit is connected through a coupling capacitance 9 to the anode 10 of the first triode section of device 8. The other terminal of the tuned circuit is connected through a grid coupling capacitance 11 to the control grid 12 of the first triode section of device 8. The junction point of inductance elements 5 and 6 is connected to the common grounded cathode 13 of device 8. A grid leak resistance 14 is connected between control grid 12 and cathode 13, and serves to impress a suitable biasing potential on the control grid 12. Suitable positive unidirectional operating potential is provided for the anode 10 through a load resistance 16 from the positive terminal of a suitable source, here shown as a battery 15, the negative terminal of which is grounded.

The operation of the electrical circuit thus far described is as follows. The first section of device 8, including anode 10, grid 12, and cathode 13, produces a sustained oscillatory current of substantially constant amplitude in the tuned circuit 5, 6, 7 is a well-known fashion, assuming that the vibratory member or vane 4 remains motionless. Movement of vane 4, such as might be effected for example by stylus 3 travelling in a conventional phonograph record sound track, produces cyclical changes in the impedance of inductance element 5. These impedance changes, being of a nature corresponding to the undulations of the record disc 1, result in amplitude modulation of the oscillatory current produced by the tuned circuit in such manner that the recorded intelligence is reproduced in the output of the first triode section of device 8. The values of coupling capacitance 11 and grid leak resistance 14 are so chosen that the bias voltage developed at the grid 12 causes the first triode section to function as a plate-bend detector for demodulating the amplitude modulated oscillation appearing at the control grid 12. The modulation components resulting from such plate-bend detection appear across load resistance 16. Thus, the first triode section of device 8 serves to produce oscillations which are modulated in accordance with the undulations of a record disc, and simultaneously to demodulate or detect the modulated oscillations so produced. The detected output of the first triode section is then applied to the second section of device 8, which includes the common cathode 13, a control grid 17, and an anode 18. Anode 18 is supplied with suitable positive unidirectional operating potential from source 15 through a load resistance 19. Control grid 17 is maintained at a suitable bias potential with respect to the common cathode 13 by means of a grid leak resistance 20 connected between grid 17 and ground. The modulation components appearing across load resistance 16 are coupled to the control grid 17 by means of a series circuit comprising a filter resistance 21 and an isolating and coupling capacitance 22, a filter capacitance 23 being provided between grid 17 and ground. Filter capacitance 23 serves to bypass any oscillation frequency components appearing across load resistance 16. The second section of device 8 then serves as an amplifier, substantially all of the amplified voltage appearing across load resistance 19 being of a frequency corresponding to the vibration frequency of vane 4. The amplified voltage appearing across load resistance 19 is then applied to further amplifying means or utilization device 2.

In the preferred embodiment of the invention shown in Figure 1, the movement of the vane 4 in response to undulations in the record disc 1 is used to change the impedance of coil 5. While it is permissible to use vane 4 to drive coil 6, any undesired distortion of the input signals which may be present is applied directly to the input circuit of the plate bend detector, whereas by using coil 5 as the driven coil, such undesired distortion is effectively isolated from the grid 12.

The vibratory member or vane 4, which is coupled to coil 5, is constructed preferably of a high resistance material; in one form of the present invention, the material used is .004-inch thick stainless steel known in the trade as American Iron and Steel Institute Type No. 302. Stainless steel type 302 contains about 18% chromium, about 8 to 9% nickel, about 0.08 to 0.2% carbon, traces of manganese, silicon, phosphorus, sulphur and copper, the remainder being iron. This material is preferred because it is substantially non-magnetic; thus a minimum amount of 120-cycle hum is introduced into the pick-up from nearby motors, transformers and the like. It has been found that stray 60-cycle fields shift the working point on the magnetization curve of the vibratory member, when it is made of magnetic material, thus resulting in undesired changes of the inductance and effective resistance of the coil 5. These undesired changes produce undesired amplitude modulation of the oscillating current. For these reasons, it is preferred to use a material possessing high resistance and low permeability. When such material is used, the desired modulation is produced substantially entirely by eddy current loss in the high resistance material, and the desired modulation is substantially unaffected by variations of permeability of member 4 in the presence of stray fields.

Amplitude modulation of the oscillations appearing in tuned circuit 5, 6, 7 in response to undulations on the record disc 1 results because of two effects. First, the quality factor or Q of the inductance element 5 is cyclically changed. In the second place, the amount of feed-back voltage from the anode 10 to the grid 12 is cyclically changed due to cyclical changes in the impedance of inductance element 5. The inductance of coil 5 is preferably made less than the inductance of coil 6 in order that, when the impedance of coil 5 is altered, the feed-back factor is altered in such a way that amplitude modulation produced by inductance change is in phase with, and thus reinforces, the amplitude modulation produced by the change in Q.

Viewed in another way, the inductances 5 and 6, taken in connection with capacitance 7, form a pi network through which oscillation voltage is transferred from anode 10 to grid 12. In the usual forms of electron discharge oscillation generators, such as the type illustrated, there need be only a part of the voltage on the anode fed back to the control grid, and, in order to maintain the generator in operation, the voltage so fed back must be maintained within certain limits. That is, if the amount of voltage fed back to the control grid is too slight, the generator ceases to oscillate. In the illustrated system, the feedback is maximum, and the intensity of oscillation is correspondingly maximum, when the impedances of coils 5 and 6 are equal. The pi network 5, 6, 7 is effective to alter in a substantial degree the amount of voltage fed back from anode 10 to grid 12 as the impedance of inductance 5 changes. In other words, variation in the impedance of coil 5 produces relatively large changes in the ratio of voltage across coil 6 to the voltage across coil 5 when the impedance of coil 5 is much smaller than the impedance of coil 6.

In the preferred system, vane 4 is constructed of a conductive material having a high specific resistance. To make it magnetic as well as conductive is useful when the member 4 need not be used in the presence of stray magnetic fields and when it is desired to reduce or eliminate inductance changes in coil 5. Also, to make member 4 magnetic introduces hysteresis loss which aids the eddy current effect in member 4 to change the effective resistance of coil 5, and consequently, the oscillation intensity.

The oscillator-detector arrangement shown in Figure 1 is substantially identical to that disclosed and claimed in the co-pending application of Henry P. Kalmus, Serial No. 662,044, filed April 13, 1946, for Modulated-Oscillator Type Signal Translating Apparatus, issued November 29, 1949 as Patent No. 2,489,379, and assigned to the same assignee as the present application. In general, in an arrangement such as that shown in Figure 1, both grid detection and plate-bend detection take place in the first section 10, 12, 13 of triode 8. As these two types of detection act differentially in the anode circuit, the output which can be obtained is limited. It has been found that if the values of capacitance 11 and resistance 14 are properly chosen, so as to prevent the bias voltage impressed on grid 12 from fluctuating substantially at an audio frequency rate, no grid detection occurs. A much larger audio frequency signal is then developed in the anode circuit of device 10, 12, 13, resulting in a greatly improved ratio between the desired signal and tube noise due to thermal agitation effects. It has also been found that if the values of capacitance 11 and resistance 14 are properly chosen, so as to enable the bias voltage impressed on grid 12 to fluctuate at a rate corresponding to the rotational speed of the record disc 1, the amplitude distortion of the modulated oscillations due to eccentricity of the record disc may be balanced out through variation of the detecting efficiency in a manner complementary to the non-linear characteristic of the modulator and transducer.

Cyclical changes in the inductance of element 5 cause a certain amount of frequency modulation of the generated wave in tuned circuit 5, 6, 7, but the plate-bend detector is substantially unresponsive to frequency modulation, due to the presence of only one tuned circuit, detection of frequency modulation being dependent on the comparison of the voltages appearing across a pair of oscillatory circuits tuned to different frequencies. Consequently, substantially only those components which produce amplitude modulation are detected and appear across load resistance 16.

There is shown in Figure 2 a fragmentary view, partly in section, of a tone arm cooperating with a record disc. A tone arm 30, pivotally mounted at one end (not shown) carries a pick-up 31 constructed in accordance with the invention. The stylus 3 cooperates with the sound track on the record disc 1. The casing holder 32, which contains a vane 4 and a cooperating coil 5 (Figure 1), is pivotally mounted about the axis of a fixed pin 33 in a pair of arms 34 disposed on opposite sides of the casing holder 32. Each arm 34 has one end thereof fastened to the tone arm 30, as shown for example by means of a screw 35, and the other end thereof circularly formed to provide a bearing member with pin 33. Arms 34 may be flexible, although it is preferred that they be non-flexible.

The casing holder 32 is normally spring-biased downwardly for rotation about the axis of pivot pin 33 by means of a coil spring 36 having its ends fastened to the tone arm 30, as shown for example by means of a screw 37. The coil spring 36 has an intermediate portion 38 which engages a shoulder 39 on the holder 32 to press the holder downwardly in the direction of counter-clockwise rotation about pin 33.

Spring 36 is made sufficiently flexible to protect the pick-up unit against injury in the event that the tone arm is dropped on a record disc. In such a case, the pick-up unit including the casing holder 32 is deflected upwardly against the action of the weak spring 36, and the heel of unit 31 engages the record; an arm 41, bearing a piece of felt 40, is fastened to the tone arm 30 by means of screw 35 to serve as a stop for limiting the movement of holder 32. This retractability feature is particularly claimed in Patent No. 2,444,218, issued on June 29, 1948 to Chalon W. Carnahan, and assigned to the present assignee.

There is shown in Figure 3 a front view of a vane, for use in a pick-up such as that described in connection with Figures 1 and 2, which has been constructed in accordance with the present invention. The vane 4 is preferably constructed of a material having a high resistance and a low permeability, for the reasons set forth in connection with Figure 1. The vane is effectively divided into two discrete mechanical systems, the general areas of which are denoted by the reference numerals 50 and 51 respectively, preferably by providing the vane with an eccentric or off-center aperture or hole 52. The stylus or needle 3 is spot welded or otherwise securely fastened to a point on the vane 4 in axial alignment with pivot point 53; vertical compliance may be provided by bending the stylus 3 to form a Z-shaped member as shown.

Suitable damping means, such as a damping block 54 of plasticized cellulose nitrate, is provided for de-emphasizing the natural frequencies of systems 50 and 51 produced by the eccentric aperture 52, and for minimizing twisting about the vertical axis. For optimum performance, it is important that damping block 54 be well secured to the body of the vane 4. This condition may be insured by melting the damping block onto the vane; by dipping the damping block in acetone momentarily, applying it to the vane, and allowing it to harden; by the use of suitable cementing material; or by other suitable means.

There is shown in Figure 4 a side elevation of the vane of Figure 3, in order to make more clear the structure of such vibratory member.

It has been found that a vane constructed in accordance with Figures 3 and 4 vibrates in two distinct and separate resonant modes, the lower one being attributable to the larger system 50 and occurring at a frequency of about 4000 cycles per second, and the higher one being attributable to the smaller system 51 and occurring at a frequency in the neighborhood of 8000 cycles per second. The damping block 54 of plasticized cellulose nitrate serves to smooth out and broaden these resonant peaks. It is seen, then, that the frequency response of a pick-up employing a vane of this type is extended beyond the cutoff frequency at 4000 cycles per second normally encountered in conventional pick-ups. In practice, it has been found that this range may be extended to include frequencies up to 10,000 cycles per second.

There is shown in Figures 5 and 6 a further modification constructed in accordance with the invention, a third discrete system being provided in the form of a flat wire 55 disposed across the eccentric hole 52. It has been found that a vane of this type displays three distinct resonant frequencies, resonances occurring at frequencies of approximately 3000, 6000, and 8000 cycles per second. By proper damping, it is possible to smooth out the response characteristic as before.

The preferred embodiment shown in Figures 7 and 8 is identical with that shown in Figures 3 and 4 with the exception that the stylus 3 is welded or otherwise securely fastened eccentrically to the body of the vane at a point opposite the aperture or hole 52; vertical compliance is provided as before. In this manner, the tip of the stylus 3 is brought into vertical alignment with the pivot point 53, thereby eliminating any moment about such point. Furthermore, the effect of mounting the needle eccentrically is to increase the larger effective mass 50 and to decrease the smaller effective mass 51. In this manner, the upper limit of the frequency response characteristic may be extended even farther. This preferred embodiment is particularly well adapted to rapid and economical construction on a mass production basis with a minimum number of manufacturing operations.

With specific reference now to Figure 9, there is shown, in graphical form, a comparison between the response characteristic 70 of a pick-up employing a vane having a single resonating mass, and the response characteristic 71 of a pick-up employing a vane having a plurality of discrete resonating masses. The recording characteristic normally used for the so-called constant velocity cut record disc is also shown as curve 72. With the conventional pick-up, it is seen that frequencies above about 4000 cycles per second are substantially eliminated from the response, whereas with the improved pick-up utilizing the present invention, high fidelity response to a frequency in the neighborhood of 10,000 cycles per second is obtainable.

While the principles of the present invention have been explained, and the preferred embodiments of the invention have been shown and described, in connection with a phonograph pick-up, it is to be clearly understood that the invention may be applied to other electro-mechanical transducers, such as for example a microphone. In such a case, in accordance with the present invention, the vibrating member is effectively divided by any means into a number of different discrete resonating systems, each of which displays a separate resonant frequency. Furthermore, although the preferred embodiment has been explained in connection with the concept of amplitude modulation of a high frequency wave in response to vibrations of a vibratory member, the invention contemplates the use of such vibration to produce frequency modulated oscillatory signals.

While there have been shown and described certain present preferred embodiments of the invention, it is to be understood that numerous variations and modifications may be made, and it is contemplated, in the appended claims, to cover all such modifications as fall within the true spirit and scope of the invention.

We claim:

1. A transducer comprising: an inductance coil; a vibratile member comprising a thin body portion of conductive material which is eccentrically apertured to define a plurality of mechanically resonant systems having different natural vibration frequencies within the audio-frequency range; means for mounting said member with said body portion adjacent said coil for varying the impedance of said coil in accordance with movement of said body portion relative to said coil; and a damping block supported adjacent at least a part of said body portion for de-emphasizing said natural frequencies.

2. A transducer comprising: an inductance coil; a vibratile member comprising a thin body portion of conductive material having a high specific resistance and eccentrically apertured to define a plurality of mechanically resonant systems having different natural vibration frequencies within the audio-frequency range; means for mounting said member with said body portion adjacent said coil for varying the damping resistance reflected in said coil in accordance with movement of said body portion relative to said coil; and a damping block supported adjacent at least a part of said body portion for de-emphasizing said natural frequencies 3. A transducer comprising: an inductance coil; a vibratile member comprising a thin substantially circular body portion of conductive material having a high specific resistance and having an eccentric substantially circular aperture defining a plurality of mechanically resonant systems having different natural vibration frequencies within the audio-frequency range; means for mounting said member with said body portion adjacent said coil for varying the damping resistance reflected in said coil in accordance with movement of said body portion relative to said coil; and a damping block supported adjacent at least a part of said body portion for de-emphasizing said natural frequencies.

4. A transducer comprising: an inductance coil; a vibratile member comprising a thin substantially circular body portion of conductive material having a high specific resistance and having an eccentric aperture and a thin metallic strip disposed across said aperture to define a plurality of mechanically resonant systems having different natural vibration frequencies within the audio-frequency range; means for mounting said member with said body portion adjacent said coil for varying the damping resistance reflected in said coil in accordance with movement of said body portion relative to said coil; and a damping block supported adjacent at least a part of said body portion for deemphasizing said natural frequencies.

5. A transducer comprising: an inductance coil; a vibratile member comprising a thin body portion of conductive material having a high specific resistance and a low magnetic permeability and eccentrically apertured to define a plurality of mechanically resonant systems having different natural vibration frequencies within the audio-frequency range; means for mounting said member with said body portion adjacent said coil for varying the damping resistance reflected in said coil in accordance with movement of said body portion relative to said coil; and a damping block of plasticized cellulose nitrate affixed to at least a part of said body portion for deemphasizing said natural frequencies.

6. A transducer unit for a phonograph pickup comprising: an inductance coil; a vibratile member comprising a thin substantially circular body portion of conductive material having a high specific resistance and having an eccentric substantially circular aperture defining a plurality of mechanically resonant systems having different natural vibration frequencies within the the audio-frequency range; means for mounting said member with said body portion adjacent said coil for varying the damping resistance reflected in said coil in accordance with movement of said body portion relative to said coil; a stylus affixed to said body portion and adapted to track the undulations of a rotatable record disc; and a damping block supported adjacent at least a part of said body portion for deemphasizing said natural frequencies.

7. A transducer unit for a phonograph pickup comprising: an inductance coil; a vibratile member comprising a thin substantially circular body portion of conductive material having a high specific resistance and having an eccentric substantially circular aperture defining a plurality of mechanically resonant systems having different natural vibration frequencies within the audio-frequency range; means for mounting said member with said body portion adjacent said coil for varying the damping resistance reflected in said coil in accordance with movement of said body portion relative to said coil; a vertically compliant stylus eccentrically affixed to said body portion and adapted to track the undulations of a rotatable record disc; and a damping block of plasticized cellulose nitrate affixed to at least a part of said body portion for deemphasizing said natural frequencies.

HENRY P. KALMUS.
ROBERT LEE PRICE.

REFERENCES CITED

The following references are of record in the file of this patent:

UNITED STATES PATENTS

| Number | Name | Date |
|---|---|---|
| 2,441,464 | Albright | May 11, 1948 |